(12) United States Patent
Toyozumi et al.

(10) Patent No.: US 11,343,179 B2
(45) Date of Patent: May 24, 2022

(54) TRANSFER DEVICE AND TRANSFER METHOD

(71) Applicant: Nippon Telegraph and Telephone Corporation, Tokyo (JP)

(72) Inventors: Kazuto Toyozumi, Tokyo (JP); Ken Takahashi, Tokyo (JP); Shigemasa Kumagawa, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/272,970

(22) PCT Filed: Sep. 9, 2019

(86) PCT No.: PCT/JP2019/035290
§ 371 (c)(1),
(2) Date: Mar. 3, 2021

(87) PCT Pub. No.: WO2020/054637
PCT Pub. Date: Mar. 19, 2020

(65) Prior Publication Data
US 2021/0344592 A1    Nov. 4, 2021

(30) Foreign Application Priority Data
Sep. 14, 2018   (JP) .............................. JP2018-172065

(51) Int. Cl.
*G06F 15/173*    (2006.01)
*H04L 45/00*    (2022.01)
*H04L 45/02*    (2022.01)

(52) U.S. Cl.
CPC .............. *H04L 45/34* (2013.01); *H04L 45/02* (2013.01)

(58) Field of Classification Search
CPC ................................ H04L 45/02; H04L 45/34
See application file for complete search history.

(56) References Cited

U.S. PATENT DOCUMENTS

2015/0304206 A1* 10/2015  Filsfils ................... H04L 45/04
                                                           709/238
2018/0083871 A1*  3/2018  Filsfils ................... H04L 45/50
(Continued)

OTHER PUBLICATIONS

Bates et al., "Multiprotocol Extensions for BGP-4," Network Working Group, RFC 2283, Feb. 1998, 10 pages.
(Continued)

*Primary Examiner* — Richard G Keehn
(74) *Attorney, Agent, or Firm* — Fish & Richardson P.C.

(57) ABSTRACT

A transfer apparatus configured to control transfer of a packet from a transmission source node to a destination node through segment routing includes: a storage unit storing node management information T1 indicating, for each node that functions as a transmission source node or a destination node, an SID list acquisition method of the nodes; a packet reception unit for receiving a reception packet from the destination node; an information setting unit for, if a destination-side SID list acquisition method of the destination node and a transmission source-side SID list acquisition method of the transmission source node do not match each other based on the node management information T1, setting the information that is needed to execute the transmission source-side SID list acquisition method in the reception packet; and a packet transmission unit configured to transmit the reception packet that was subjected to the setting to the transmission source node.

6 Claims, 5 Drawing Sheets

(56) References Cited

U.S. PATENT DOCUMENTS

| | | | |
|---|---|---|---|
| 2018/0109450 A1* | 4/2018 | Filsfils | H04L 45/74 |
| 2019/0020738 A1* | 1/2019 | Paul | H04L 45/58 |
| 2021/0083975 A1* | 3/2021 | Chunduri | H04L 45/34 |
| 2021/0111999 A1* | 4/2021 | Gandhi | H04L 43/0858 |
| 2021/0176168 A1* | 6/2021 | Eckert | H04L 45/302 |

OTHER PUBLICATIONS

Datatracker.ietf.org, [online], "PCEP Extensions for Segment Routing," Jul. 5, 2018, retrieved on Jul. 13, 2018, retrieved from URL<https://datatracker.ietf.org/doc/draft-ietf-pce-segment-routing/?include text-l>, 25 pages.

Filsfils et al., "Segment Routing Architecture," Internet Engineering Task Force (IETF), RFC 8402, Jun. 2018, 20 pages.

Mohapatra et al., "The BGP Encapsulation Subsequent Address Family Identifier (SAFI) and the BGP Tunnel Encapsulation Attribute," Network Working Group, RFC 5512, Apr. 2009, 14 pages.

* cited by examiner

Fig. 3

| TYPE NUMBER | TRANSMISSION SOURCE NODE POSSESSED INFORMATION | IDENTIFIER INFORMATION FROM DESTINATION NODE | TYPE CONVERSION INFORMATION |
|---|---|---|---|
| 1 | Color, METRIC | [a]Color/[b] NO INFORMATION | [c]-/[d]Color |
| 2 | Color, SID LIST | [a]Color/[b] NO INFORMATION | [c]-/[d]Color |
| 3 | Color | [a]Color/[b] NO INFORMATION | [c]SID LIST/[d]Color, SID LIST |
| 4 | - | [a]Color/[b] NO INFORMATION | [c]SID LIST (DELETE Color)/ [d], SID LIST |
| 5 | SID LIST | [a]Color/[b] NO INFORMATION | [c](DELETE Color)/[d]- |
| ... | ... | ... | ... |

TRANSFER DEVICE AND TRANSFER METHOD

CROSS-REFERENCE TO RELATED APPLICATIONS

This application is a National Stage application under 35 U.S.C. § 371 of International Application No. PCT/JP/2019/035290, having an International Filing Date of Sep. 9, 2019, which claims priority to Japanese Application Serial No. 2018-172065, filed on Sep. 14, 2018. The disclosure of the prior application is considered part of the disclosure of this application, and is incorporated in its entirety into this application.

TECHNICAL FIELD

The present invention relates to a transfer apparatus and a transfer method.

BACKGROUND ART

Some routing techniques for explicitly designating a path of a network use transfer labels. Segment routing (SR) shown in NPL 1 is a representative example of a routing technique. In SR, a transmission source node executes transfer in accordance with a transfer label list called an SID (segment ID) list as the transfer labels.

Conventionally, there have been many methods by which a transmission source node acquires an SID list to be used by the transmission source node. For example, there is a method in which a destination node transfers an identifier needed to generate an SID list to a transmission source node using MP-BGP (Multi-Protocol-Border Gateway Protocol) and the transmission source node generates an SID list based on the identifier (see NPL 2), a method in which a transmission source node acquires an SID list generated by an external system such as a PCE (Path Computation Element) (see NPL 3) using PCEP (Path Computation Element Protocol), or a BGP controller (see NPL 4) using BGP, and the like.

CITATION LIST

Non Patent Literature

[NPL 1] "Segment Routing Architecture, IETF RFC8402" [online], [searched for on Aug. 28, 2018], Internet <URL: https://tools.ietf.org/html/rfc8402>

[NPL 2] "Multiprotocol Extensions for BGP-4, IETF RFC2283", [online], [searched for on Aug. 28, 2018], Internet <URL: https://tools.ietf.org/html/rfc2283>

[NPL 3] "PCEP Extensions for Segment Routing", [online], [searched for on Aug. 28, 2018], Internet <URL: https://datatracker.ietf.org/doc/draft-ietf-pce-segment-routing/>

[NPL 4] "The BGP Encapsulation Subsequent Address Family Identifier (SAFI) and the BGP Tunnel Encapsulation Attribute, IETF RFC5512", [online], [searched for on Aug. 28, 2018], Internet <URL: https://tools.ietf.org/html/rfc5512>

SUMMARY OF THE INVENTION

Technical Problem

Accompanying a predetermined service operation, a network including a group of nodes to which different SID list acquisition methods are applied is formed through repeated network configuration modification and the like in some cases. However, there is a possibility that transfer through SR cannot be executed between nodes to which different SID list acquisition methods have been applied. For this reason, conventionally, there has been a problem in that extensibility of a network in which transfer through SR is executed is restricted. NPL 1 to NPL 4 also do not include description or mention of a countermeasure for this kind of problem.

In view of this kind of background, the present invention aims to improve extensibility of a network in which transfer through segment routing is executed.

Means for Solving the Problem

In order to solve the above-described problem, an invention according to claim 1 is a transfer apparatus configured to control information that is needed in order to enable transfer of a packet from a transmission source node to a destination node through segment routing, the transfer apparatus including: a storage unit configured to store, for each node that functions as the transmission source node or the destination node, node management information indicating an SID list acquisition method of the node; a packet reception unit configured to receive a reception packet from the destination node; an information setting unit configured to, if a destination-side SID list acquisition method of the destination node and a transmission source-side SID list acquisition method of the transmission source node do not match each other based on the node management information, set information that is needed to execute the transmission source-side SID list acquisition method in the reception packet; and a packet transmission unit configured to transmit the reception packet that was subjected to the setting to the transmission source node.

Also, an invention according to claim 4 is a transfer method of a transfer apparatus configured to control transfer of a packet from a transmission source node to a destination node through segment routing. A storage unit of the transfer apparatus stores, for each node that functions as the transmission source node or the destination node, node management information indicating an SID list acquisition method of the node. The transfer apparatus executes: a reception step of receiving a reception packet from the destination node; a setting step of setting, if a destination-side SID list acquisition method of the destination node and a transmission source-side SID list acquisition method of the transmission source node do not match each other based on the node management information, information that is needed to execute the transmission source-side SID list acquisition method in the reception packet; and a transmission step of transmitting the reception packet that was subjected to the setting to the transmission source node.

With the inventions according to claims 1 and 4, even if the transmission source node and the destination node use different SID list acquisition methods, due to the information setting of the transfer apparatus, the transmission source node can acquire an SID list without changing the SID list acquisition method, and can reliably execute transfer to the destination node through segment routing. That is, a transfer apparatus 1 can realize transfer through segment routing between nodes with different SID list acquisition methods.

Accordingly, the extensibility of the network in which transfer through segment routing is executed can be improved.

Also, an invention according to claim 2 is the transfer apparatus according to claim 1, in which for each transmission source-side SID list acquisition method, the storage unit stores conversion condition information in which information possessed by the transmission source node in order to execute the transmission source-side SID list acquisition method, an identifier set in the reception packet received from the destination node, and information that is needed to execute the transmission source-side SID list acquisition method are associated with each other, and based on the conversion condition information, the information setting unit sets the information that is needed to execute the transmission source-side SID list acquisition method in the reception packet.

Also, an invention according to claim 5 is the transfer method according to claim 4, in which for each transmission source-side SID list acquisition method, the storage unit stores conversion condition information in which information possessed by the transmission source node in order to execute the transmission source-side SID list acquisition method, an identifier set in the reception packet received from the destination node, and information that is needed to execute the transmission source-side SID list acquisition method are associated with each other, and in the setting step, the transfer apparatus sets the information that is needed to execute the transmission source-side SID list acquisition method in the reception packet based on the conversion condition information.

With the inventions according to claims 2 and 5, it is possible to manage information that is needed for the transmission source node to acquire the SID list using the transfer apparatus, and thus no matter what kind of method the SID list acquisition method of the transmission source node is, the transmission source node can acquire the SID list without changing the SID list acquisition method.

Also, an invention according to claim 3 is the transfer apparatus according to claim 1 or claim 2, in which if the information that is needed to execute the transmission source-side SID list acquisition method includes an SID list, an SID list generated by an external system is included as the SID list.

Also, an invention according to claim 6 is the transfer method according to claim 4 or claim 5, in which if the information that is needed to execute the transmission source-side SID list acquisition method includes an SID list, an SID list generated by an external system is included as the SID list.

With the inventions according to claims 3 and 6, the transmission source node can acquire the SID list generated by the external system, and therefore can realize flexible transfer control in which the transfer apparatus and the external system are linked.

Effects of the Invention

According to the present invention, the extensibility of the network in which transfer through segment routing is executed can be improved.

BRIEF DESCRIPTION OF DRAWINGS

FIG. 3 is a diagram showing a data structure of conversion condition information.

DESCRIPTION OF EMBODIMENTS

Hereinafter, a mode for implementing the present invention (hereinafter called "the present embodiment") will be described with reference to the drawings.

Configuration

Figure 1:
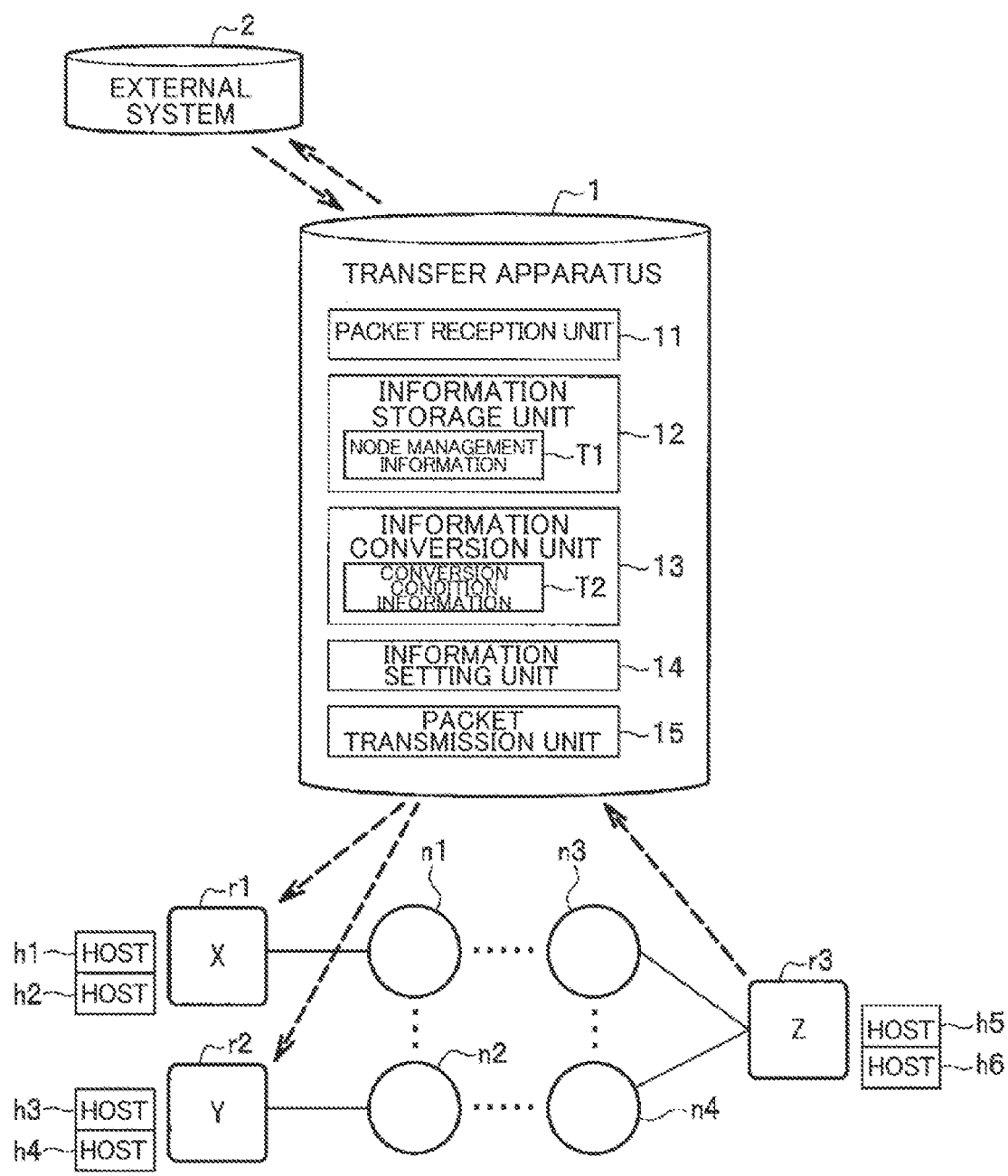
FIG. 1 is a diagram showing a functional configuration of a transfer system including a transfer apparatus of the present embodiment.

As shown in FIG. 1, a transfer system of the present embodiment includes: a transfer apparatus 1, an external system 2, nodes r1 to r3 and n1 to n4, and hosts h1 to h6. The transfer apparatus 1, the external system 2, the nodes r1 to r3 and n1 to n4, and the hosts h1 to h6 are communicably connected to each other.

The transfer apparatus 1 is a transfer apparatus that controls information that is needed in order to enable transfer through SR between nodes including the nodes r1 to r3 and n1 to n4. The transfer apparatus 1 can be, for example, a route reflector, but there is no limitation to this. The transfer apparatus 1 is a computer including hardware such as an input-output unit constituted by an input-output I/F (interface) or the like, a storage unit constituted by a hard disk, a flash memory, a RAM (Random Access Memory), or the like, and a control unit constituted by a CPU (Central Processing Unit) and the like. For example, the above-described processing is executed by the control unit expanding a program stored in the storage unit to a storage region of the storage unit and executing the program. The transfer apparatus 1 of the present embodiment can realize cooperation between this kind of software and hardware. Details of the transfer apparatus 1 will be described later.

The external system 2 is an apparatus that generates an SID list and transmits the generated SID list to the transfer apparatus 1. For example, the external system 2 can be a PCE that uses PCEP or a BGP controller that uses BGP, but there is no limitation to this. The transfer apparatus 1 can transmit the SID list that was received from the external system 2 to the transmission destination node.

The nodes r1 to r3 are apparatuses that terminate packets to be transferred through SR. For example, the nodes r1 to r3 can be PE (Provider Edge) routers or BGP routers, but there is no limitation to this. The nodes r1 to r3 can function as transmission source nodes or destination nodes of the transferred packets. In the description of the present embodiment, the nodes r1 and r2 are transmission source nodes, and the node r3 is a destination node.

Note that the nodes r1 to r3 shown in FIG. 1 are a portion of all of the PE routers or the like arranged in the network. Also, as shown in FIG. 1, the identifier of the node r1 is "X", the identifier of the node r2 is "Y", and the identifier of the node r3 is "Z".

The nodes n1 to n4 are apparatuses that transfer packets through SR. The nodes n1 to n4 are, for example, core routers, and relay the packets exchanged between the nodes r1 to r3. Note that the nodes n1 to n4 shown in FIG. 1 are part of all of the core routers arranged in the network.

The hosts h1 to h6 are general-purpose calculators that provide a predetermined service. The hosts h1 and h2 are accommodated in the node r1. The node r1 includes VRFs (Virtual Routing and Forwarding; not shown) that correspond to the hosts h1 and h2, and can transmit a packet for each VRF in accordance with the SID list. Also, the hosts h3 and h4 are accommodated in the node r2. The node r2 includes VRFs (not shown) that correspond to the hosts h3 and h4 and can transmit a packet for each VRF in accordance with the SID list. Also, the hosts h5 and h6 are accommodated in the node r3. The node r3 includes VRFs (not shown) that correspond to the hosts h5 and h6 and can transmit a packet for each VRF in accordance with the SID list.

Note that the transfer destinations of the transferred packets are determined in accordance with the SID list, and the packets are transferred to the destination node. Also, RTs (Route Targets) can be applied to the packets to be transferred. An RT is an identifier that identifies which VRF a route corresponds to during route advertisement. That is, an RT can identify which VRF is to be used.

Details of Transfer Apparatus 1

As shown in FIG. 1, the transfer apparatus 1 includes a packet reception unit 11, an information storage unit 12, an information conversion unit 13, an information setting unit 14, and a packet transmission unit 15. Each of the nodes r1 to r3 and n1 to n4 is a BGP peer (see NPL 2) with the transfer apparatus 1.

The packet reception unit 11 receives packets from the nodes r1 to r3. In particular, the packet reception unit 11 receives the packets from the node r3 that is the destination node in a prior stage in which transfer of the packets through SR is realized. The packets that are received are, for example, BGP packets, but there is no limitation to this. Type information indicating "type", which identifies the SID list acquisition methods of the nodes r1 to r3, is set in the packets received by the packet reception unit 11 from each of the nodes r1 to r3.

Figure 2:
FIG. 2 is a diagram showing a data structure of node management information.

The information storage unit 12 stores the SID list acquisition method to be applied to each of the nodes r1 to r3 as node management information T1. As shown in FIG. 2, the node management information T1 includes an entry in which a "PE" field in which the identifiers of the nodes r1 to r3 are stored, and a "type number" field in which values indicating the type of the SID list acquisition method are stored are associated with each other for each of the nodes r1 to r3. The transfer apparatus 1 may also set (Config) the node management information T1 in advance in the information storage unit 12, and may also read out the type from the type information set in the BGP packets received from the nodes r1 to r3 and store the read-out type in the node management information T1.

The information storage unit 12 can function as a storage unit of the transfer apparatus 1, and the storage unit of the transfer apparatus 1 stores the node management information T1.

Upon receiving the packet from the destination node, the information conversion unit 13 refers to the node management information T1 and converts the information set in the packet received from the destination node into information that is needed in order for the transmission source node to acquire the SID list. The conversion performed by the information conversion unit 13 conforms to the conversion condition information T2 included in the information conversion unit 13. The storage unit of the transfer apparatus 1 stores the conversion condition information T2.

As shown in FIG. 3, the conversion condition information T2 includes entries in which a "type number" field, a "transmission source node possessed information" field, an "identifier information from destination node" field, and a "type conversion information" field are associated with each other for each type identifying an SID list acquisition method (transmission source SID list acquisition method) that functions as a transmission source node.

A value indicating the type of the SID list acquisition method is stored in the "type number" field, and the "type number" field is the same as the "type number" field of the node management information T1 (FIG. 2).

Information possessed by the transmission source node in order to execute the SID list acquisition method of the transmission source node is stored in the "transmission source node possessed information" field.

An identifier that is set in the packet received from the node functioning as the destination node is stored in the "identifier information from destination node" field. The stored identifier includes, for example, information that is needed for the node to generate an SID list.

Information that is to be subjected to a conversion such as addition or deletion by the information conversion unit 13, and which is needed for the transmission source node to acquire an SID list (information needed to execute the transmission source-side SID list acquisition method), is stored in the "type conversion information" field.

"Color" shown in FIG. 3 is an identifier for identifying an SR policy in the case where there are multiple SR policies for determining how to designate the transfer route to the destination. Color is an Extended Community of BGP, which is defined in RFC5512 (NPL 4), and is expressed as a predetermined numeric value.

Also, "metric" shown in FIG. 3 is a value for identifying the cost in the case where SR routing is performed using the transfer route of the transmission path based on the cost allocated to the interface of each node. A known method can be used as the cost calculation method, and thus description thereof is omitted.

In the conversion condition information T2, in the entry in which the type number is "1", the transmission source node possesses information on Color and metric, and if Color has been set as the identifier set in the packet received from the destination node ([a] Color), it is indicated that conversion is not needed ([c]-). Also, if the identifier has not been set in the packet received from the destination node ([b] no information), it is indicated that Color is to be added to the packet ([d] Color).

Note that the added Color can be, for example, a predetermined default Color.

In the entry in which the type number is "2", the transmission source node possesses Color and an SID list, and if Color has been set as the identifier set in the packet received from the destination node ([a] Color), it is indicated that conversion is not needed ([c]-). Also, if there is no identifier set in the packet received from the destination node ([b] no information), it is indicated that Color is to be added to the packet ([d] Color).

Note that the added Color can be, for example, a predetermined default Color.

In the entry in which the type number is "3", the transmission source node possesses Color, and if Color has been set as the identifier to be set in the packet received from the destination node ([a] Color), it is indicated that the SID list is to be added to the packet ([c] SID list). Also, if there is no identifier set in the packet received from the destination node ([b] no information), it is indicated that Color and the SID list are to be added to the packet ([d] Color, SID list).

Note that the added Color can be, for example, a predetermined default Color, but there is no limitation to this. Also, examples of the added SID list include (1) an SID list generated and acquired by the transfer apparatus 1 in the external system 2, (2) an SID list generated through an internal calculation (e.g., topology discovery performed through BGP-LS (BGP-Link State) of the transfer apparatus 1, and (3) an SID list generated through Config, but there is no limitation to these.

In the entry in which the type number is "4", if the transmission source node does not possess any information that is needed to execute the SID list acquisition method and Color has been set as the identifier set in the packet received from the destination node ([a] Color), the SID list is added to the packet, and it is indicated that Color is to be deleted ([c] SID list (delete Color)). Also, if there is no identifier set in the packet received from the destination node ([b] no information), it is indicated that the SID list is to be added to the packet ([d] SID list).

Note that examples of the added SID list include (1) an SID list generated and acquired by the transfer apparatus 1 using the external system 2, (2) an SID list generated through internal calculation (e.g., topology discovery through BGP-LS) of the transfer apparatus 1, and (3) an SID list generated through Config, but there is no limitation to these.

In the entry in which the type number is "5", the transmission source node possesses an SID list, and if Color has been set as the identifier set in the packet received from the destination node ([a] Color), it is indicated that the Color is to be deleted ([c] delete Color). Also, if there is no identifier set in the packet received from the destination node ([b] no information), it is indicated that conversion is not needed ([d]-).

The information conversion unit 13 can convert the packet received from the destination node so as to match the type of the transmission source node.

The information setting unit 14 sets the information that is needed in order for the transmission source node to acquire the SID list in the packet received from the destination node in accordance with the conversion performed by the information conversion unit 13.

The packet transmission unit 15 transmits the packet received from the destination node to the transmission source node. The packet to be transmitted to the transmission source node includes the information set by the information setting unit 14.

The transmission source node reads out the information that is needed in order for the transmission source node to acquire the SID list from the packet received from the packet transmission unit 15, and can acquire the SID list using an SID list acquisition method equipped in the transmission source node. Accordingly, the transmission source node can execute transfer through SR with destination nodes that execute SID list acquisition methods of all types.

Processing

Figure 4:
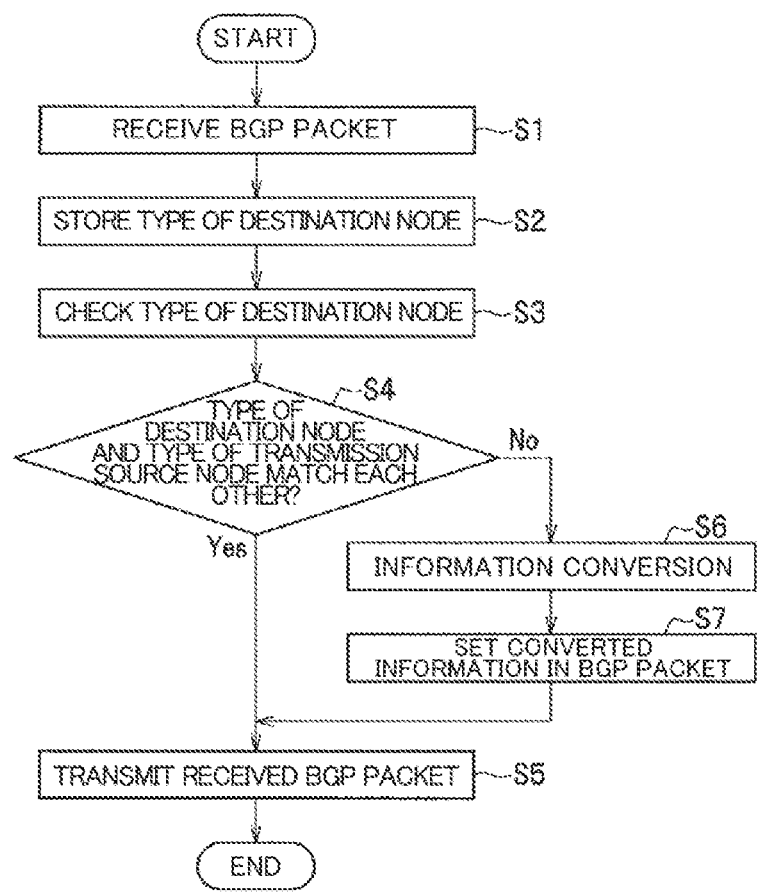
FIG. 4 is a flowchart showing transfer control processing of the present embodiment.

The processing executed by the transfer apparatus 1 of the present embodiment will be described with reference to FIG. 4. The processing shown in FIG. 4 starts when, for example, a predetermined function update (Update) occurs in the destination node, but the start trigger is not limited thereto. The processing shown in FIG. 4 is processing that aims to notify another node arranged in a network in which the destination node is arranged, that is, the transmission source node, of the update content on the destination node side.

Note that the destination node and the transmission source node are BGP peers with the transfer apparatus 1.

First, the transfer apparatus 1 receives, for example, a BGP packet as the packet received from the destination node using the packet reception unit 11 (step S1). The received BGP packet is, for example, an UPDATE packet, and an identifier of the transmission source node (e.g., IP address) is set in the address header.

Next, if the type of the destination node, that is, the type of the SID list acquisition method executed by the destination node has been set, the transfer apparatus 1 reads out the type from the received BGP packet and stores the read-out type in the information storage unit 12 in the format of the node management information T1 (step S2). However, if the information storage unit 12 has set the node management information T1 in advance for the node connected to the network being managed, step S2 may also be omitted.

Next, the transfer apparatus 1 checks the type of the destination node using the information conversion unit 13 (step S3). The checking of the type of the destination node can be realized by the information conversion unit 13 reading out the type of the destination node set in the BGP packet received from the destination node. Also, if the type of the destination node has not been set in the BGP packet received from the destination node, the checking of the type of the destination node can be realized by the information conversion unit 13 referring to the node management information T1 of the information storage unit 12.

Next, the transfer apparatus 1 uses the information conversion unit 13 to determine whether or not the type of the destination node (type of the SID list acquisition method executed by the destination node: destination-side SID list acquisition method of the destination node), and the type of the transmission source node (type of the SID list acquisition method executed by the transmission source node: transmission source-side SID list acquisition method of the transmission source node) match each other (step S4). The checking of the type of the transmission source node can be realized by the information conversion unit 13 referring to the node management information T1 of the information storage unit 12 using, as a key, the identifier of the transmission source node set in the address header of the received BGP packet.

If the type of the destination node and the type of the transmission source node match each other (Yes in step S4), this means that the conversion performed by the information conversion unit 13 is not needed. Accordingly, the transfer apparatus 1 transmits the BGP packet received from the destination node to the transmission source node using the packet transmission unit 15 (step S5) and ends the processing shown in FIG. 4.

If the type of the destination node and the type of the transmission source node do not match each other (No in step S4), the transfer apparatus 1 converts the information set in the BGP packet received from the destination node using the information conversion unit 13 in accordance with the conversion condition information T2 (step S6). Specifically, the information conversion unit 13 performs addition of the SID list and addition or deletion of Color on the BGP packet received from the destination node (see FIG. 3).

Next, the transfer apparatus 1 uses the information setting unit 14 to set the converted information, which is information converted by the information conversion unit 13, in the BGP packet received from the destination node (step S7). The converted information is information that is needed in order for the transmission source node to acquire the SID list, and specifically is information that has been subjected to addition of the SID list and addition or deletion of Color. The information setting unit 14 sets information that matches the type of the transmission source node in the BGP packet received from the destination node. In other words, the information setting unit 14 can set the information that is needed to execute the transmission source-side SID list acquisition method in the BGP packet based on the conversion condition information T2. Thereafter, the transfer apparatus 1 uses the packet transmission unit 15 to transmit the BGP packet that was subjected to the setting performed by the information setting unit 14 to the transmission source node (step S5), and ends the processing shown in FIG. 4.

According to the processing shown in FIG. 4, regardless of the type of the SID list acquisition method of the destination node, the transmission source node can transfer the packet through SR using the SID list acquisition method originally equipped in the transmission source node.

Specific Example

A specific example of the present embodiment will be described with reference to FIG. 5. The present specific example is an example for realizing communication between the node r3 (identifier "Z"; FIG. 1), in which the type number (see FIG. 3) is "2", and the node r1 (identifier "X"; FIG. 1), in which the type number is "4". That is, when the node r3 functions as a transmission source node, the information that is needed to execute of the SID list acquisition method is Color (see [d] color in the entry of the type number "2" in the conversion condition information T2 shown in FIG. 3). When the node r1 functions as a transmission source node, the information that is needed to execute the SID list acquisition method is the SID list (see [d] SID list in the entry of the type number "2" in the conversion condition information T2 shown in FIG. 3).

Figure 5:
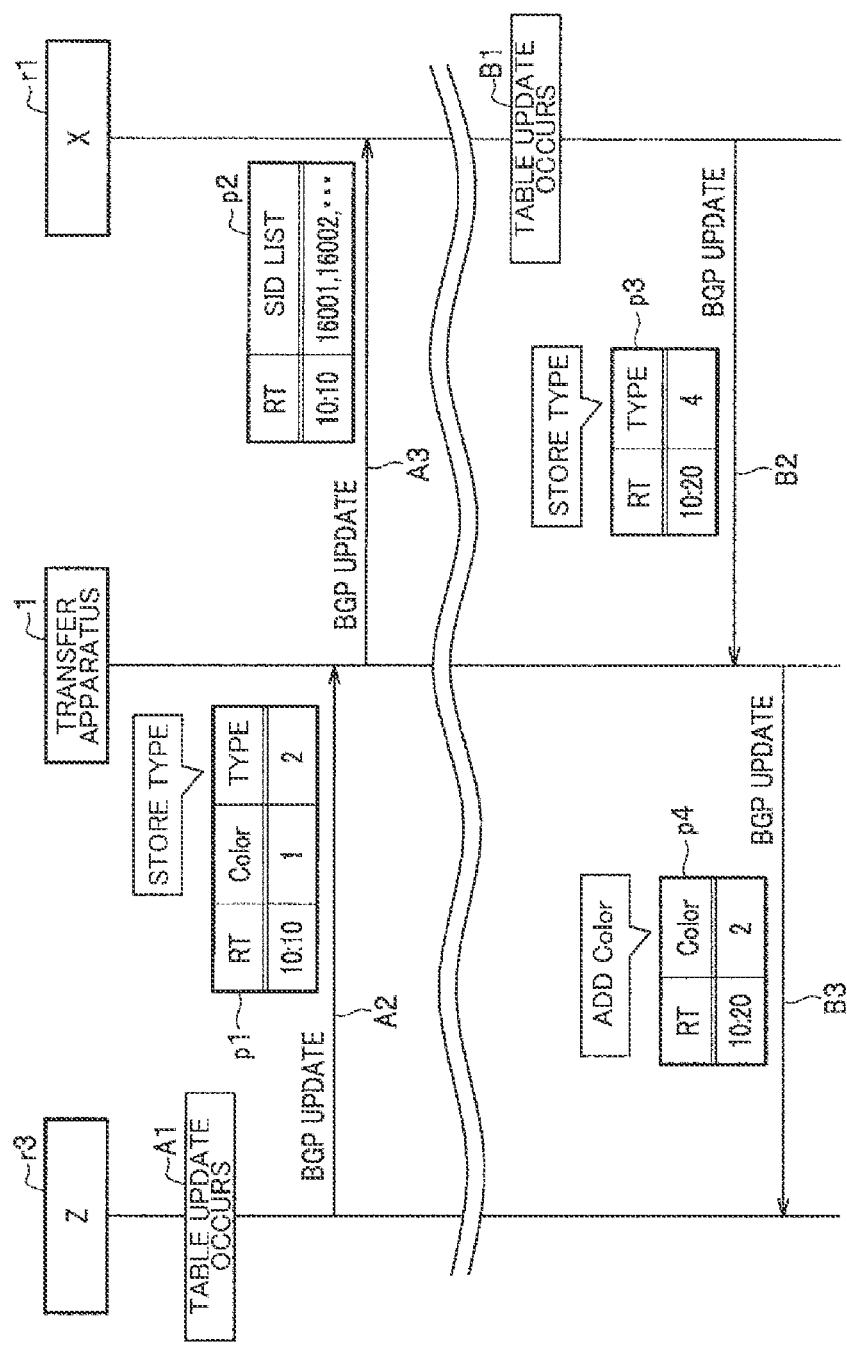
FIG. 5 is a diagram illustrating a specific example of the present embodiment.

As shown on the upper side in FIG. 5, when an update of a predetermined table (Update) occurs in the node r3 (step A1), the node r3 functions as a destination node and transmits the BGP packet p1 (written as "BGP UPDATE" in FIG. 5) to the transfer apparatus 1 (step A2). The BGP packet p1 includes information such as RT, in which the value "10:10", which indicates that the VRF of the node r1 is to be used, is set, Color, in which the value "1", which indicates the SR policy to be used by the node r3, is set, and the type, in which the value "2" is set as the type number of the node r3. Other information included in the BGP packet p1 (information that does not contribute to the generation of the SID list) is not included in the drawing.

The transfer apparatus 1 reads out the type number "2" from the BGP packet p1 received from the node r3 and stores it in the information storage unit 12 in the format of the node management information T1 (see step S2 of FIG. 4). Since the nodes r3 and r1 have different types, the transfer apparatus 1 uses the information conversion unit 13 and the information setting unit 14 to convert and set the information of the BGP packet p1, and to match it with the type (corresponds to the type number "4") of the node r1 that functions as the transmission source node. Specifically, the transfer apparatus 1 deletes the information of the type of the BGP packet p1, deletes Color of the BGP packet p1, adds the SID list in which "16001, 16002, . . . ", which indicates a row of labels, is generated, and thus generates the BGP packet p2 (written as "BGP UPDATE" in FIG. 5).

The transfer apparatus 1 uses the packet transmission unit 15 to transmit a BGP packet p2 to the node r1 (step A3). The node r1 can acquire the SID list from the BGP packet p2 received from the transfer apparatus 1 and can execute transfer through SR to the node r1 using the acquired SID list.

Also, as shown on the lower side of FIG. 5, when an update of the predetermined table (Update) occurs in the node r1 (step B1), the node r1 functions as a destination node and transmits the BGP packet p3 (written as "BGP UPDATE" in FIG. 5) to the transfer apparatus 1 (step B2). The BGP packet p3 includes information such as RT, in which the value "10:20", which indicates that the VRF of the node r3 is to be used, is set, and the type, in which the value "4" is set as the type number of the node r1. Other information included in the BGP packet p3 (information that does not contribute to the generation of the SID list) is not included in the drawing.

The transfer apparatus 1 reads out the type number "4" from the BGP packet p3 received from the node r1 and stores it in the information storage unit 12 in the format of the node management information T1 (see step S2 of FIG. 4). Since the nodes r3 and r1 have different types, the transfer apparatus 1 uses the information conversion unit 13 and the information setting unit 14 to convert and set the information of the BGP packet p3, and to match it with the type (corresponds to the type number "2") of the node r3 that functions as the transmission source node. Specifically, the transfer apparatus 1 deletes the information of the type of the BGP packet p3, adds color, which is identified by the value "2" as the pre-determined default value, and generates the BGP packet p4 (written as "BGP UPDATE" in FIG. 5).

The transfer apparatus 1 uses the packet transmission unit 15 to transmit a BGP packet p4 to the node r3 (step B3). The node r3 can execute transfer through SR on the node r1 using its originally-included SID list, in accordance with color (color, which is identified by the value "2") set in the BGP packet p4 received from the transfer apparatus 1.

Summary

According to the present embodiment, even if the transmission source node and the destination node use different SID list acquisition methods, due to the information setting of the transfer apparatus 1, the transmission source node can acquire the SID list without changing the SID list acquisition method, and can reliably execute transfer to the destination node through segment routing. That is, the transfer apparatus 1 can realize transfer through segment routing between nodes with different SID list acquisition methods.

Accordingly, the extensibility of the network in which transfer through segment routing is executed can be improved.

Also, although large-scale changes and revisions have conventionally been needed in a network in which a group of nodes with different SID list acquisition methods is installed, according to the present embodiment, it is possible to eliminate the need for such changes and revisions, and transfer through segment routing can be realized without significantly influencing the existing environment.

Also, according to the present embodiment, a group of nodes that have been combined so as not to rely on a specific manufacturer among multiple manufacturers who produce nodes can be selected, a network that is optimal in terms of function, performance, and cost can be easily constructed, and the flexibility of the network can be improved.

Also, according to the present embodiment, the information that is needed for the transmission source node to acquire the SID list can be managed by the transfer apparatus 1, and the transmission source node can acquire the SID list without changing the SID list acquisition method, no matter what kind of method the SID list acquisition method of the transmission source node is.

Also, according to the present embodiment, since the transmission source node can acquire the SID list generated by the external system 2, it is possible to realize flexible transfer control in which the transfer apparatus 1 and the external system 2 are linked.

Other (a) If conversion and setting are performed such that color is added to the reception packet to be received from the destination node, the color that is added may also be color that has been set in the transmission destination node instead of the default color as in the present embodiment.

(b) It is also possible to realize a technique in which the various techniques described in the embodiments are combined as needed.

REFERENCE SIGNS LIST

1 Transfer apparatus
2 External system
11 Packet reception unit
12 Information storage unit
13 Information conversion unit
14 Information setting unit
15 Packet transmission unit
T1 Node management information
T2 Conversion condition information
r1 to r3, n1 to n4 Node
h1 to h6 Host

The invention claimed is:

1. A transfer apparatus comprising one or more hardware processors and configured to control information that is needed in order to enable transfer of a packet from a transmission source node to a destination node through segment routing, the transfer apparatus comprising:
   a storage unit comprising one or more memory devices and configured to store, for each node that functions as the transmission source node or the destination node, node management information indicating a segment identification (SID) list acquisition method of the node;
   a packet reception unit comprising the one or more hardware processors and configured to receive a reception packet from the destination node;
   an information conversion unit comprising the one or more hardware processors and configured to compare a firs type of a destination-side SID list acquisition method executed by the destination node and a second type of a transmission source-side SID list acquisition method executed by the transmission source node;
   an information setting unit comprising the one or more hardware processors and configured to, in response to determining that the first type of the destination-side SID list acquisition method executed by the destination node and the second type of the transmission source-side SID list acquisition method executed by the transmission source node do not match each other based on the node management information, set information that is needed to execute the transmission source-side SID list acquisition method in the reception packet; and
   a packet transmission unit comprising the one or more hardware processors and configured to transmit the reception packet that was subjected to the setting to the transmission source node.

2. The transfer apparatus according to claim 1, wherein for each transmission source-side SID list acquisition method, the storage unit is configured to store conversion condition information comprising (i) information possessed by the transmission source node in order to execute the transmission source-side SID list acquisition method, (ii) an identifier set in the reception packet received from the destination node, and (iii) information that is needed to execute the transmission source-side SID list acquisition method, wherein (i), (ii) and (iii) are associated with each other and in combination correspond to the transmission source-side SID list acquisition method executed by the transmission source node, and based on the conversion condition information, the information setting unit sets the information that is needed to execute the transmission source-side SID list acquisition method in the reception packet.

3. The transfer apparatus according to claim 1, wherein in response to determining that the information that is needed to execute the transmission source-side SID list acquisition method includes an SID list, an SID list generated by an external system is included as the SID list.

4. A transfer method of a transfer apparatus configured to control transfer of a packet from a transmission source node to a destination node through segment routing, wherein a storage unit of the transfer apparatus stores, for each node that functions as the transmission source node or the destination node, node management information indicating a segment identification (SID) list acquisition method of the node, and the transfer apparatus executes:
   receiving a reception packet from the destination node;
   comparing a first type of a destination-side SID list acquisition method executed by the destination node and a second type of a transmission source-side SID list acquisition method executed by the transmission source node;
   setting, in response to determining that the first type of the destination-side SID list acquisition method executed by the destination node and the second type of the transmission source-side SID list acquisition method executed by the transmission source node do not match each other based on the node management information, information that is needed to execute the transmission source-side SID list acquisition method in the reception packet; and
   transmitting the reception packet that was subjected to the setting to the transmission source node.

5. The transfer method according to claim 4, wherein for each transmission source-side SID list acquisition method, the storage unit stores conversion condition information comprising (i) information possessed by the transmission source node in order to execute the transmission source-side SID list acquisition method, (ii) an identifier set in the reception packet received from the destination node, and (iii) information that is needed to execute the transmission source-side SID list acquisition method are associated with each other and in combination correspond to the transmission source SID list acquisition method of the transmission source node, and
   wherein the transfer apparatus sets the information that is needed to execute the transmission source-side SID list acquisition method in the reception packet based on the conversion condition information.

6. The transfer method according to claim 4, wherein in response to determining that the information that is needed to execute the transmission source-side SID list acquisition method includes an SID list, an SID list generated by an external system is included as the SID list.

* * * * *